US006711653B1

United States Patent
Quach et al.

(10) Patent No.: US 6,711,653 B1
(45) Date of Patent: Mar. 23, 2004

(54) FLEXIBLE MECHANISM FOR ENFORCING COHERENCY AMONG CACHING STRUCTURES

(75) Inventors: Nhon Quach, San Jose, CA (US); Gary N. Hammond, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,196

(22) Filed: Mar. 30, 2000

(51) Int. Cl.[7] .............................................. G06F 12/00
(52) U.S. Cl. ...................... 711/146; 711/143; 711/207; 711/145; 713/1
(58) Field of Search .................... 711/141, 146, 711/143, 207, 203, 142, 144, 145; 713/1, 2

(56) References Cited

U.S. PATENT DOCUMENTS 5,544,345 A  *  8/1996  Carpenter et al. ........... 711/141
5,781,774 A  *  7/1998  Krick .......................... 713/1

OTHER PUBLICATIONS

Motorola, MC88110 Second Generation RISC Microprocessor User's Manual, ©1991, p. 6–5–6–12.*

* cited by examiner

*Primary Examiner*—T Nguyen
*Assistant Examiner*—Brian R. Peugh
(74) *Attorney, Agent, or Firm*—Blakely, Sokoloff, Taylor & Zafman LLP (57) ABSTRACT

The present invention provides a computer system that is capable of operating in a first or second cache coherency mode according to the operating environment in which the computer system is booted to run. If the operating environment supports memory attribute aliasing (MAA), the computer system implements a cache coherency mechanism that supports MAA. If the operating environment does not support MAA, the computer system implements a cache coherency mechanism that does not support MAA.

20 Claims, 7 Drawing Sheets

FLEXIBLE MECHANISM FOR ENFORCING COHERENCY AMONG CACHING STRUCTURES

BACKGROUND OF THE INVENTION

1. Technical Field

The present invention relates to computer systems and, in particular, to mechanisms for maintaining cache coherency in computer systems

2. Background Art

A computer system typically includes a processor core to execute instructions on operands and a memory system to provide the operands and instructions ("data") to the processor core. The memory system is organized as a hierarchy that includes one or more caches, a random access memory, and a mass storage medium such as a hard disc. Data is distributed among the various storage structures in a manner designed to provide fast access to the data which is most frequently used. This distribution is governed, in part, by the cache management policy implemented by the computer system.

Programs executed by the processor core use logical addresses to refer to the data they manipulate. Logical addresses are independent of the actual location of stored data in the memory system, which allows these programs to run without the need for detailed information about the computer system. The actual storage locations in the memory system are indicated by physical addresses. The operating system that runs on the computer system determines the mapping between logical addresses and the physical addresses. Operating systems typically maintain a page table in main memory to store logical-to-physical address translations.

A processor that had to access the page table for each memory reference would be unnecessarily slow, since main memory accesses have relatively long latencies. Most memory systems include a translation look-aside buffer (TLB) to store near the processor core the physical address translations for recently referenced logical addresses. The TLB may also store memory attributes, which define, for example, the speculative, cacheability, and write-policies of the physical address locations referenced through the logical address. The memory attributes may be used by the computer system to manage the distribution of data among the caches and memory, order memory accesses, and ensure coherency among the different portions of the memory system. For one common TLB configuration, a portion of a logical address forms an address tag of a TLB entry. The physical address to which the logical address maps is stored in one data field of the entry and the memory attribute of the physical address is stored in another data field of the entry.

A complicating feature associated with address translation is that the operating system may map more than one logical address to the same physical address. In doing so, the operating system may associate a different memory attribute with each logical address that maps to the physical address. For example, the attribute associated with one logical address may indicate that the referenced data is cacheable, while the attribute associated with the other logical address may indicate that referenced data is uncacheable. Because the attributes are used to manage the caching strategy employed for different data blocks, a discrepancy in memory attributes can create incoherence between the cache and main memory data if no mechanism is provided to identify and handle the conflict.

Memory attribute aliasing (MAA) occurs when a memory page is accessed with inconsistent memory attributes. For example, a first reference to a memory address may indicate a write-back (WB) memory attribute, which identifies the targeted data as suitable for caching. A subsequent reference may indicate an uncacheable (UC) memory attribute for the same memory address (or an overlapping memory address). The cached data will be missed by the subsequent access because caches are not ordinarily searched for UC memory references. System environments that support MAA provide mechanisms to identify these inconsistencies and ensure coherency between the different storage structures of the memory system. For example, computer systems based on the x86 architecture of Intel® Corporation of Santa Clara, Calif., support MAA. This support requires additional hardware and typically carries a performance hit because additional steps are required to identify and manage memory attribute conflicts.

Some programming environments avoid the performance hit associated with MAA by allowing no more than one reference to a physical memory location to reside in the cache subsystem at a given time. For example, computer systems based on IA64, UNIX or LINUX programming environments obtain higher performance by relying on their operating systems to prevent MAA (IA64 is the 64-bit programming environment developed by Intel® Corporation). However, if these environments are implemented on processors that support MAA, they will lose this performance benefit.

The present invention addresses these and other issues related to supporting MAA.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a flexible approach to maintaining cache coherency in a computer system that supports different programming environments. A computer system in accordance with the present invention may implement different cache coherency mechanisms, depending on the programming environment in which the system operates.

For one embodiment of the invention, the processor includes a status register having a mode status bit. The mode status bit is set to a value that depends on the type of operating system loaded into the processor's memory when it is booted. The computer system implements one of two or more cache coherency mechanisms according to the value of the mode status bit.

A computer system that implements the present invention may be run using the highest performance cache coherency mechanism that is consistent with its operating environment. If the operating environment requires support for memory attribute aliasing (MAA), a cache coherency mechanism that supports MAA is implemented. As noted above, support for MAA can reduce system performance. If the system is booted in an operating environment that does not support MAA or supports it at a reduced level, a suitable cache coherency mechanism may be implemented.

For example, a processor operating in the x86 environment supports MAA through "self-snooping". For a self-snoop operation, the processor compares the target address asserted on the bus for a UC memory access with the address tags in its own caches. Self-snooping determines whether an earlier WB, i.e. cacheable, memory access stored data for the same location in one of the caches. Since the self-snoop operation competes with other load and store operations for access to the caches, it can delay execution of these operations, reducing the processor's performance.

The Itanium processor of Intel® Corporation, of Santa Clara, Calif., supports both IA32 and IA64 operating environments. The former requires full MAA support. The latter provides only minimal support for MAA to obtain higher performance. The Itanium processor has a mode-specific register (MSR) that includes a mode status bit. The mode status bit is set to a first value if the processor is booted in an IA32 operating environment, and the processor implements a cache coherency mechanism that supports MAA. The modes status bit is set to a second value if the processor is booted in an IA64 operating environment, and the processor implements a cache coherency mechanism that does not support MAA.

The present invention is illustrated below with reference to the IA32 and IA64 operating environments. The invention is not limited to the illustrated embodiments and may be applied to any computer system this is capable of supporting different operating environments. In particular, the present invention provides support for programming environments that implement different cache coherency mechanisms.

Figure 1:
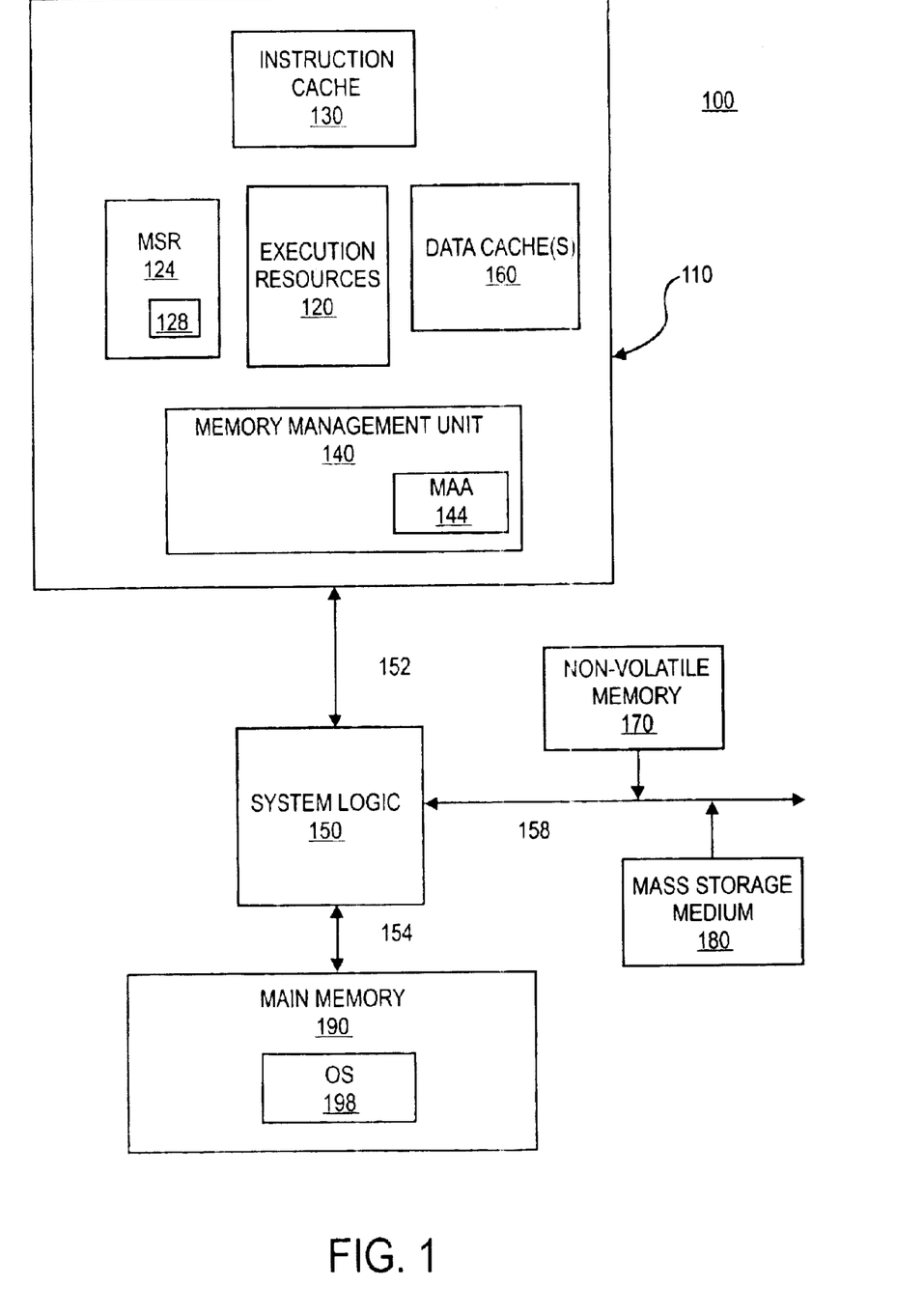
FIGS. 1 is a block diagram of one embodiment of a computer system that implements the present invention.

FIG. 1 is a block diagram of one embodiment of a computer system 100 that implements the present invention. Computer system 100 includes a processor 110, a main memory 190, a non-volatile memory 170, a mass storage device 180 and system logic 150. System logic 150 handles communications among processor 110, main memory 190, mass storage device 180 and non-volatile memory 170 through buses 152, 154, and 158. An operating system 198 is loaded into main memory 190 from, e.g. mass storage device 180, when computer system 100 is booted.

Processor 110 includes execution resources 120, an instruction cache 130, a memory management unit (MMU) 140, a data cache 160 and a mode status register (MSR) 124. Instruction cache 130 provides instructions to execution resources 120, and a data cache 160 stores operands that are processed by execution resources 120 under control of the instructions. Cache 160 represents one or more cache structures that form a portion of a memory hierarchy that also includes main memory 190.

MMU 140 manages accesses to components of the memory subsystem formed by cache 130, cache 160, and main memory 190. For example, MMU 140 routes memory request to caches(s) 160, forwards these to main memory 190, as necessary, and implements a cache coherency mechanism according to the state of a mode status bit 128 in MSR 124. Embodiments of computer system 100 may also include an off-chip cache (not shown) in the memory hierarchy.

For the disclosed embodiment of computer system 100, MMU 140 includes MAA logic 144 which may be activated or deactivated, in whole or in part, according to the value of mode status bit 128. Mode status bit 128 is set to a first value when compute system 100 is booted in a first operating environment that support MAA. Mode status bit 128 is set to a second value when compute system 100 is booted in a second operating environment that does not support MAA. Various aspects of the selected cache coherency mechanisms are implemented by MMU 140 and operating system 198, alone or in combination.

Figure 2:
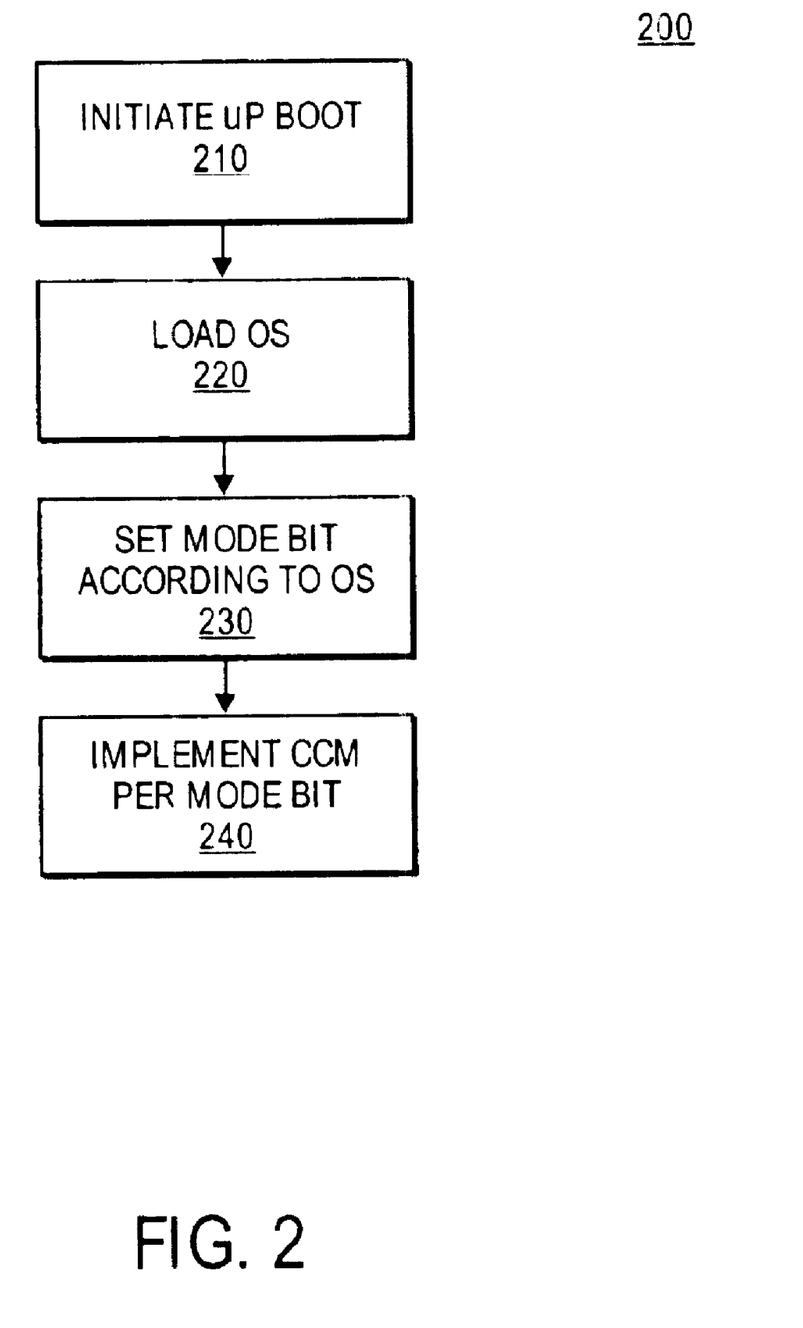
FIG. 2 is a flowchart representing one embodiment of a method for placing the computer system of FIG. 1 in a first or a second cache coherency mode.

FIG. 2 is a flow chart illustrating a method in accordance with the present invention for implementing alternate cache coherency mechanisms. A bootstrap process is initiated 210 in response to a reset or a power on condition. The bootstrap process tests the processor and various system level components for proper operation and loads 220 an OS into the processor's main memory. For computer system 100, a bootstrapping routine is stored in non-volatile memory 170, and a copy of the OS is stored in mass storage device 192. The bootstrapping routine loads various portions of the OS into main memory 190 when system 100 is booted. The OS may also be loaded from other sources, including a server coupled to computer system 100 through a network (not shown).

The mode status bit is set 230 to a value that depends on which OS is loaded, and the computer system implements 240 a cache coherency mechanism according to the value of the mode status bit. The mode status bit is visible to resources of computer system 100 that implement portions of the cache coherency mechanism. For the disclosed embodiment of the invention, this includes various functional blocks of MMU 140 such as MAA logic 144.

The present invention is illustrated using the IA32 and IA64 operating environments of Intel® Corporation. Table 1 summarizes the memory attributes for these environments and the different caching protocols observed for data having these attributes.

TABLE 1

| MA | Name | IA64 | IA32 | Description |
|---|---|---|---|---|
| UC | Uncacheable | Y | Y | Uncacheable memory. No copies of data stored in the cache(s). All memory accesses appear on the bus and no speculative, i.e. out-of-order, accesses are allowed. |
| WC | Write-Combing | Y | N | Uncacheable memory. Similar to UC memory except that data to be written to main memory may be temporarily stored in a special purpose, write-combining buffer. Data returned from memory is not cached. |
| WP | Write-Protected | N | Y | Cacheable memory with respect to "reads". Uncacheable memory with respect to "writes". |
| USWC | Uncacheable, Speculative, Write-Combining | N | Y | Uncacheable memory. Similar to WC in IA64 except that speculative accesses are allowed. |
| WT | Write-Through | N | Y | Cacheable memory for which loads fetch a line into the cache if a cache miss occurs and stores are written back to main memory Stores that hit in the cache may update the cache line. |
| WB | Write-Back | Y | Y | Cacheable memory for which loads fetch a line into the cache if a cache miss occurs and stores that hit in the cache are satisfied from the cache without any bus traffic to main memory. |

For the disclosed cache coherency mechanisms, MMU 140 uses the MA designation of a memory reference, e.g. a load or a store operation, to determine how the access is handled. IA32 and IA64 compliant cache coherency mechanisms are illustrated below for the case in which a UC memory reference follows a WB memory reference to the same physical address or to overlapping physical addresses.

Figure 3A:
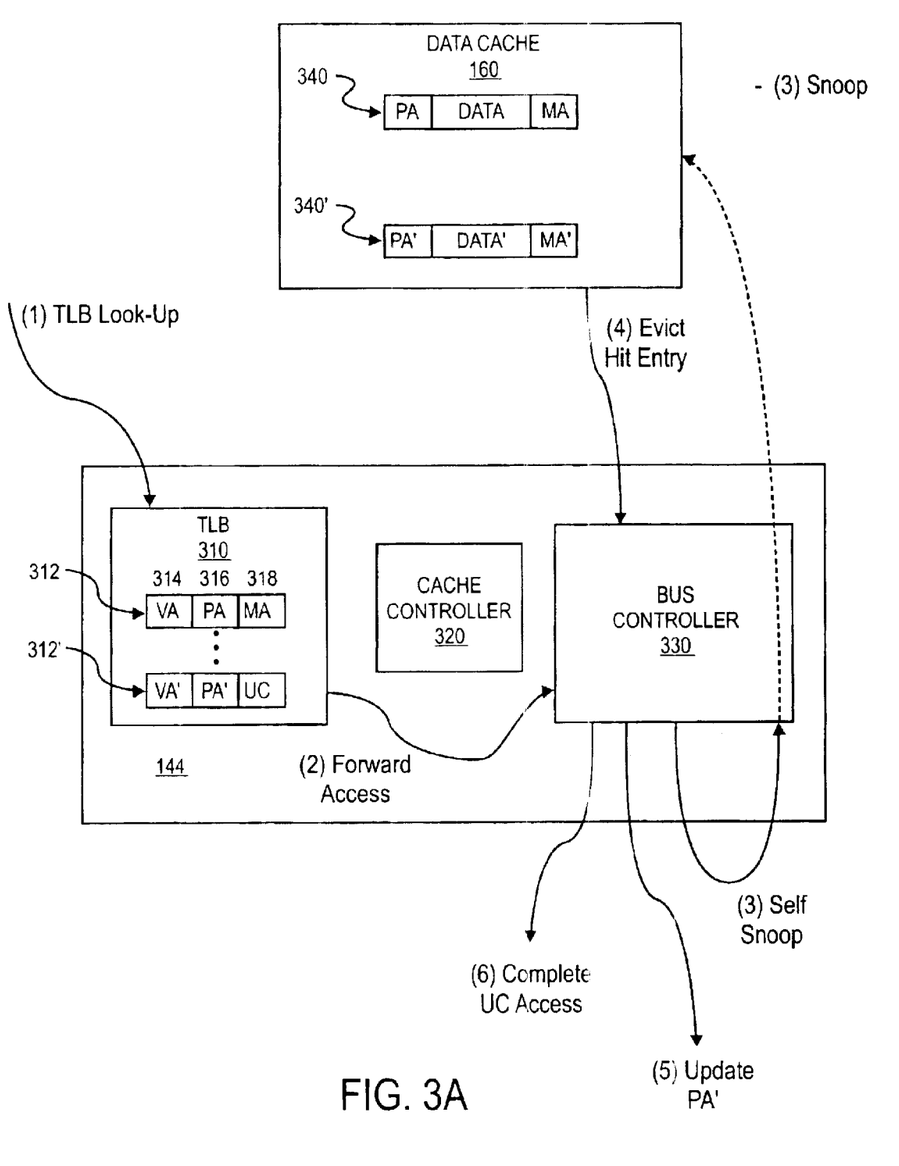
FIGS. 3A and 3B are block diagrams illustrating the operations of first and second cache coherency mechanisms, respectively, in the computer system of FIG. 1.

"FIG. 3A represents one embodiment of a MMU 140 and its interaction with cache 160 when computer system 100 implements a first cache coherency mechanism. The disclosed embodiment of MMU 140 includes a translation look-aside buffer (TLB) 310, cache controller 320, and a bus controller 330. MAA logic 144 is shown distributed between cache controller 320 and bus controller 330 to illustrate a particular embodiment. The present invention does not depend on the distribution of functions among the different logic blocks of MMU 140."

A virtual address (VA) is provided (1) to TLB 310, which compares it with its entries 312 to identify an associated physical address (PA). For the disclosed embodiment of TLB 310, each entry 312 includes a tag field 314, a data field 316, and a memory attribute field 318. The VA or a portion of it is compared against the contents of tag fields 314 to determine if TLB 310 stores a corresponding translation. If a match is found, i.e. a TLB hit, the contents of data field 316 for the matching entry provides a pointer to the PA targeted by the access. The contents of attribute field 318 are used to manage the access.

"For the exemplary access, the VA hits an entry 312' of TLB 310, and the associated MA indicates that UC memory is being accessed. Accordingly, cache controller 330 forwards the access to bus controller 330, bypassing cache 160 (2). Bus controller 330 triggers a bus cycle that include a self-snoop (3) of cache 160 to determine if any MA aliasing occurred. In the disclosed example, the self-snoop hits an entry 340' of cache 160, which is associated with the same PA as TLB entry 312', but which has a different MA (WB). That is, the memory attribute of the data is aliased, since the PA is associated with two different MAs."

If the UC access, e.g. a read, is allowed to proceed before the results of the WB access are reflected at the PA, main memory 190 and cache 160 will not be coherent. The cache coherency mechanism illustrated in FIG. 3A supports MAA by evicting (4) the entry from cache 160 and writing (5) the data to main memory 190 before proceeding with the UC access (6). If the snoop does not hit in cache 160, the bus controller completes the initial UC access without the intervening update.

Figure 4:
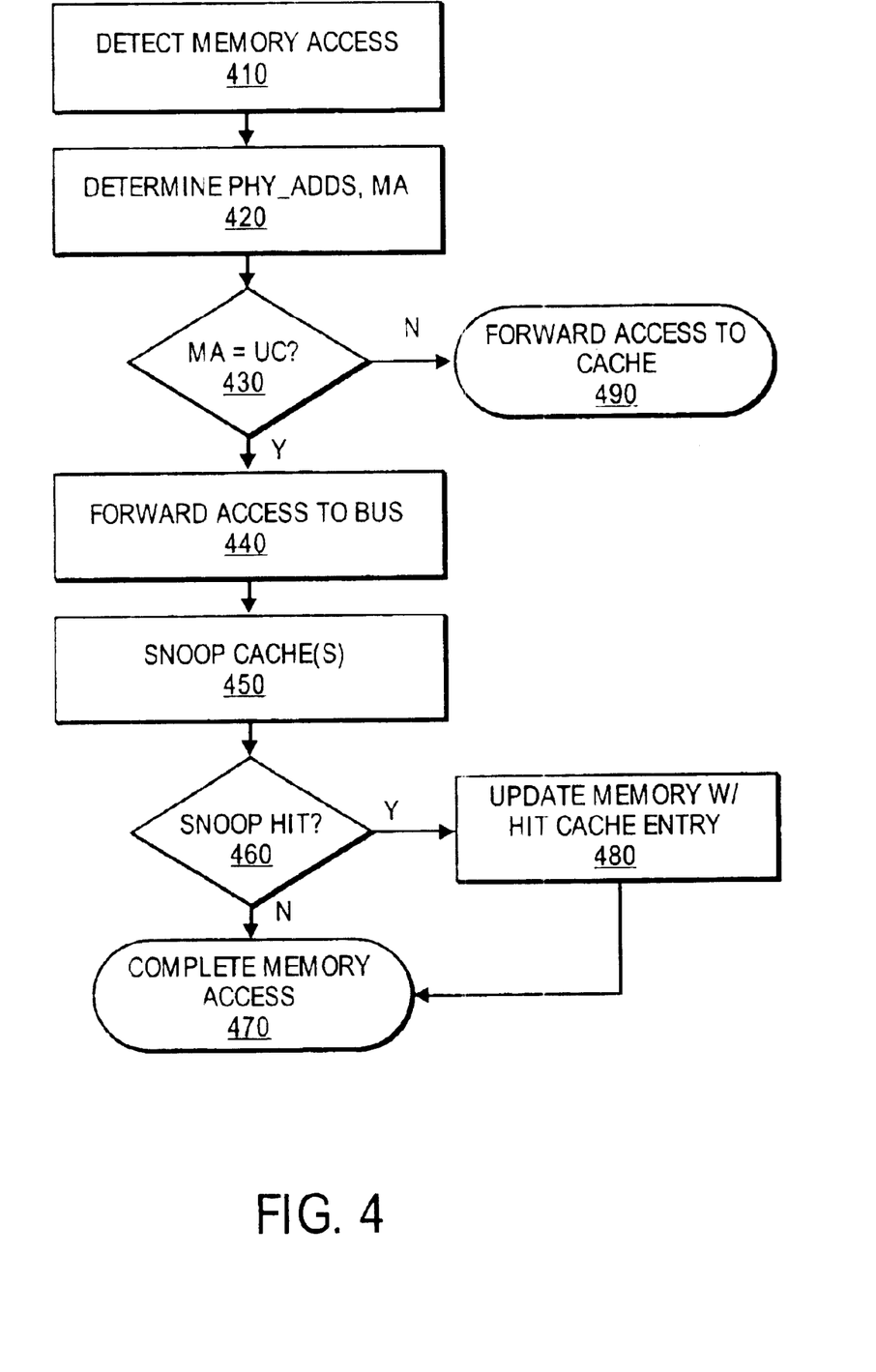
FIG. 4 is a flowchart representing one embodiment of a method for maintaining cache coherency in accordance with the first cache coherency mechanism.

FIG. 4 is a flowchart that summarizes a method 400 for supporting MAA in accordance with the first cache coherency mechanism. When a memory access is detected 410, a TLB determines 420 a PA and MA from the logical address (LA) specified by the access. If the MA indicates the access targets cacheable data 430, the access is forwarded to the caches(s) 490. If the MA indicates the access targets uncacheable data (MA=UC) 430, the access is forwarded 440 to a bus controller and the cache(s) is snooped 450 for the corresponding PA. If the snoop does not hit in the cache 460, the original access is completed 470. If the snoop hits 460 in the cache, main memory is updated 480 with data from the hit entry before the original access is completed 470.

Table 2 summarizes the responses of computer system 100, when it implements the first cache coherency mechanism, to a sequence of first and second memory references that alias the same physical address.

TABLE 2

| | 1st Ref | | | | |
|---|---|---|---|---|---|
| 2nd Ref | WB | WT | WP | UC | USWC |
| WB | No MAA | No MAA | OS prevents this sequence | No MAA | Flush line on WCB hit |

TABLE 2-continued

| | 1st Ref | | | | |
|---|---|---|---|---|---|
| 2nd Ref | WB | WT | WP | UC | USWC |
| WT | Self snoop cache(s) | No MAA | OS prevents this sequence | No MAA | Flush line on WCB hit |
| WP | Treat reads as WB, Treat writes as UC w/o snoop. | Treat reads as WB, Treat writes as UC w/o snoop. | No MAA | No MAA | Flush line on WCB hit |
| UC | Caches snooped, not accessed. | Caches snooped, not accessed. | Caches snooped, not accessed. | No MAA | No MAA |
| USWC | Return data on cache hit, | Caches not accessed. Snoop caches | Caches not accessed. Snoop caches | No MAA | No MAA |

Self-snooping uncacheable accesses to detect and correct memory attribute aliases can reduce the performance of computer system 100 significantly. For example, self-snoops compete with normal load and store operations for access to the cache(s), reducing the bandwidth available for these operations. An alternate cache coherency mechanism implemented on computer system 100 eliminates the need for the snoop and the additional access. Under this alternate cache coherency mechanism, the OS is responsible for identifying aliased memory addresses before they are stored in the memory subsystem. Since the OS typically manages the mapping between physical and logical addresses, this approach may be implemented as part of the mapping operation. In particular, it may be implemented when the OS maps a physical address to a new logical address, i.e. when the physical address is remapped. For this cache coherency mechanism, MMU 140 provides a check procedure to ensure that no memory attribute aliases slip past the OS-implemented portion of the cache coherency mechanism.

Figure 5:
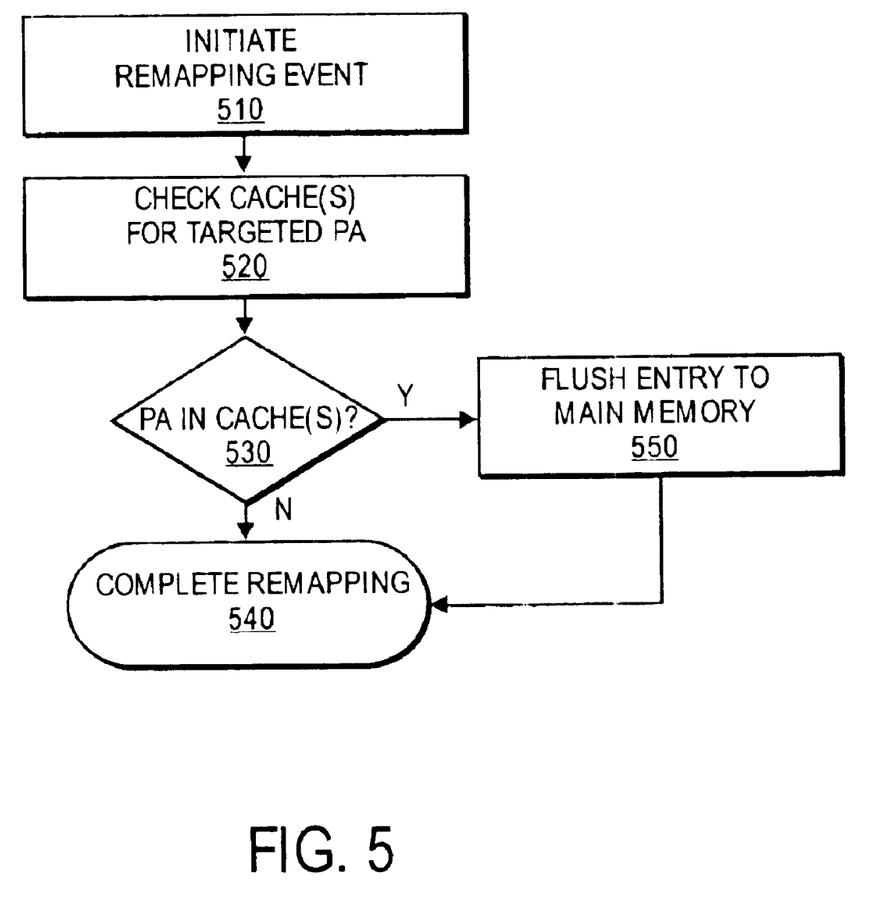
FIG. 5 is a flowchart representing one embodiment of a software-implemented portion of a method for maintaining cache coherency in accordance with the second cache coherency mechanism.

FIG. 5 represents a software implemented method 500 for handling memory attribute aliases in computer system 100 when it operates under the second cache coherency mechanism. When a remapping operation is initiated 510, the OS checks 520 the cache for physical addresses targeted by the remapping operation. If no cache entry associated with the targeted PA is found in the cache 530, the remapping operation completes 540. If a cache entry associated with the targeted PA is found 530, the cache entry is flushed 550 to main memory and the remapping operation completes 550.

Provided the OS handles the cache evictions properly, cache 160 and TLB 310 can not store multiple references to the same physical address, and the possibility of MAA is eliminated. However, because the consequences of undetected MAA are severe, e.g. data corruption, computer system 100 provides a check for MA conflicts when the processor operates in the second cache coherency mode. For this embodiment of the cache coherency mechanism, MMU 140 forwards all accesses to cache 160, even those designated with an uncacheable MA. As long as an access designated as uncacheable does not register a hit in cache 160, no incoherence exists between the cache and main memory. If an access designated as uncacheable does hit in cache 160, a memory attribute conflict is indicated. For one embodiment of the invention, a machine check abort may is initiated in response to a conflict. Other embodiments of the invention may support different responses to a memory attribute conflict.

Figure 3B:
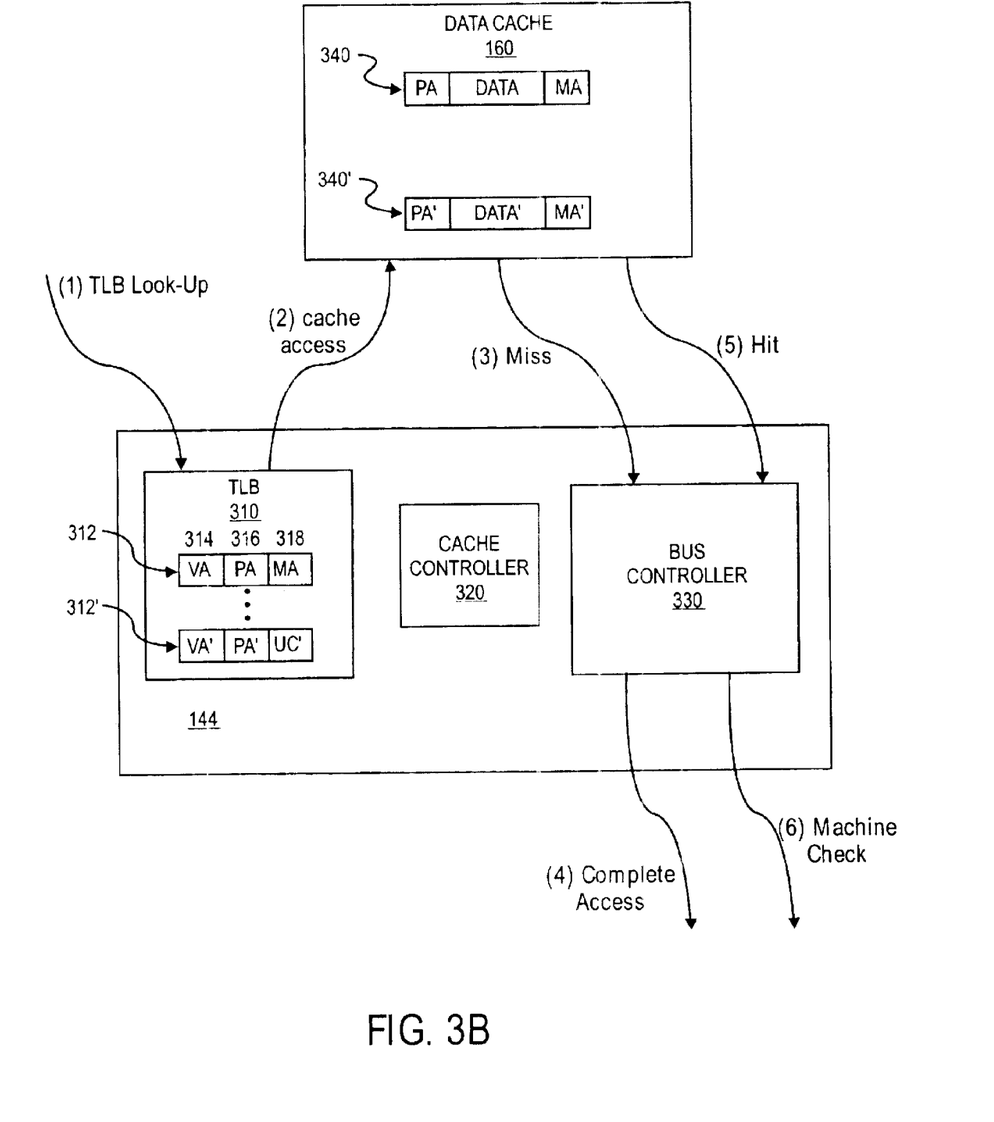

FIG. 3B illustrates the operations implemented by computer system 100 to check for MAA when it implements the second cache coherency mechanism. A virtual address (VA) is provided (1) to TLB 310. If the virtual address or a portion matches one of tag fields 314, data and attribute fields 316 and 318, respectively, provide the corresponding PA and MA for the access. In the disclosed example, the MA in TLB 310 indicates that UC memory is being accessed.

According to the second cache coherency mechanism, cache controller 320 forwards (2) the access to cache(s) 160 despite its UC memory attribute. Provided the software-controlled portion of the second cache coherency mechanism (FIG. 5) has been properly implemented, the access will not hit any entries in cache(s) 160, i.e. cache miss (3). In this case, the UC access proceeds to bus controller 330, which forwards (4) the UC access to main memory 190. If the UC access hits (5) an entry in cache(s) 160, a memory attribute conflict is indicated, and the system issues a machine check abort (6). While the transactions to cache 160 and bus controller 330 are described sequentially, persons skilled in the art and having the benefit of this disclosure will recognize that at least some portions of these operations may proceed in parallel.

Figure 6:
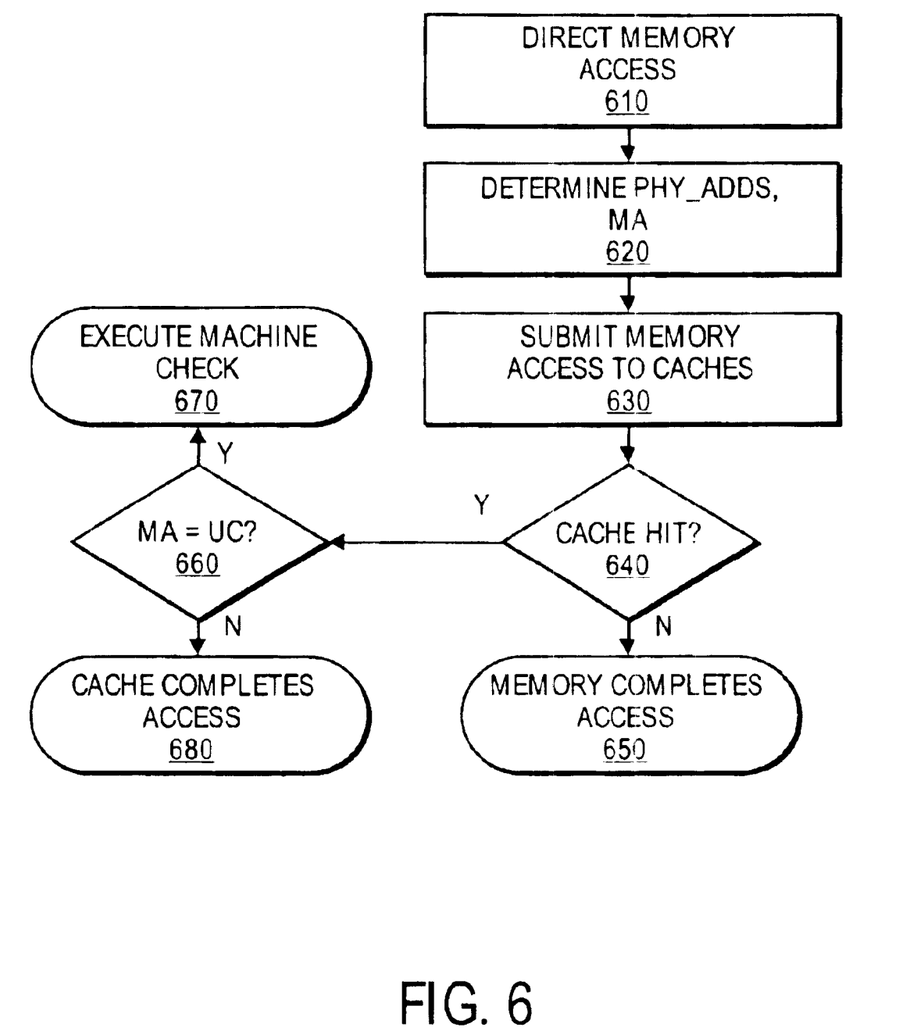
FIG. 6 is a flowchart representing one embodiment of a method for checking for memory attribute conflicts in accordance with the second cache coherency mechanism.

"FIG. 6 is a flowchart summarizing one embodiment of a method 600 implemented by computer system 100 to check for memory attribute conflicts when it implements the second cache coherency mechanism. Method 600 is initiated when a memory access is detected 610. A TLB determines a PA and MA for the access 620, and these are forwarded 630 to the cache(s). If no cache hit is detected 640, the access is completed by the memory 650. If the cache hit is detected 640 and the MA indicates 660 that the target data is uncacheable, a machine check is executed 670. If the MA indicates 660 that the target data is cacheable, the access is completed 680 by the cache."

Table 3 summarizes the responses of computer system 100, when it implements the second cache coherency mechanism, to a sequence of first and second memory references that alias the same physical address. In the Table, CB stands for coalescing buffer and MCA stands for a Machine Check Abort.

TABLE 3

| 2nd Ref | 1st Ref | | | | |
|---|---|---|---|---|---|
| | WB | WT | WC | UC | NaTPage |
| WB | No MAA | No MAA | If OS fails to flush CB, MCA may be taken | No MAA | No MAA |
| WT | If OS fails to flush page, MCA taken | No MAA | If OS fails to flush CB, MCA may be taken | No MAA | No MAA |
| UC | If OS fails to flush page, MCA taken | If OS fails to flush page, MCA taken | If OS fails to flush CB, MCA may be taken | No MAA | No MAA |
| WC | If OS fails to flush page, MCA taken | If OS fails to flush page, MCA may be taken | No MAA | No MAA | No MAA |

In accordance with the present invention, processor 100 supports a first cache coherence mechanism (FIGS. 3A, 4) if it is in a first mode, and it supports a second cache coherence mechanism (FIGS. 3B, 5, 6) if it is in a second mode. For the disclosed embodiment of the invention, mode bit 128 of mode status register 124 indicates which cache coherency mechanism is operative. For example, mode bit 128 may be set to the first value if processor 110 is booted for an IA32 system environment, and mode bit 154 may be set to the second value if processor 110 is booted for an IA64, UNIX or LINUX system environment.

Table 4 summarizes the MAA logic output for various incoming accesses that generate different responses in IA64 and IA32 operating environments. The differences are illustrated for the case in which cache 160 (FIG. 1) represents a hierarchy of three caches, L0, L1, and L2.

The first column of Table 4 indicates the type of access generated by, e.g., execution resources 120 (FIG. 1) and the memory attribute indicated for the access. The access types (or their corresponding instructions) which are handled differently in the two cache coherence mechanisms are loads, stores, instruction fetches (Ifetch), instruction prefetches (IPFetch), cache flushes (FC), coalescing buffer flushes (CB Flush), and coalescing buffer line evictions (CB Evict).

The remaining columns summarize the response of the MAA logic to the indicated incoming access. For example, the second, third and fourth columns indicate the type of bus cycle generated by the access (if it appears on the bus), the memory attribute associated with the bus cycle, and the size of the data block targeted by the bus cycle. The three left most bits in the fifth and sixth columns indicate which of L0, L1, and L2 are self-snooped when the indicated bus cycle is generated by the bus controller (For different processor embodiments, L0, L1 and L2 may be referred to as L1, L2, and L3, respectively). The right most bit indicates whether an access is forwarded to the L2 cache by the cache controller. The bus cycle types represented by the acronyms of the second column are summarized below the table.

TABLE 4

| | MAA Logic Output | | | | |
|---|---|---|---|---|---|
| Incoming Access (MA) | Bus Req. | MA | Length | IA64 Snoop/check | IA32 Snoop/Check |
| Load (WT) | BRL | WT | 64 B | 0000 | 0010 |
| Load (UC) | BRP | UC | Variable | 0000 | 1110 |
| Store (WT) | BWP | WT | Variable | Not Supported | 0100 |
| Store (UC) | BWP | UC | Variable | 0000 | 1110 |
| Ifetch (WP) | BRL | WP | 64 B | Not Supported | 0001 |
| IPFetch (UC) | BRP | UC | 16 B | NA | 0000 |
| FC | BIL | NA | NA | 1110 | 0110 |
| CB Evict | BWP | WC | 16 B | 0000 | 0110 |
| CB Flush | BWL | WC | 64 B | 0000 | 0110 |

In table 4, Ifetch is an instruction fetch, IPFetch is an instruction prefetch, FC is an cache flush instruction, CB Evict and CB Flush are coalescing buffer evict and coalescing buffer flush instruction. The following acronyms apply to the bus request types:

BRL Bus Read Line
BWL Bus Write Line
BRP Bus Read Partial (Line)
BWP Bus Write Partial (Line)
BIL Bus Invalidate Line There has thus been disclosed a system and method for supporting different cache coherency mechanisms on a computer system. A computer system implements a first cache coherency mechanism or a second cache coherency mechanism according to the operating system in which it runs. For one embodiment of the invention, the processor includes a mode status bit in a mode status register that is set when the computer system is booted. The processor also includes a memory management unit, the operations of which are adjusted according to the state of the mode status bit. For another embodiment of the invention, the first cache coherency protocol supports memory attribute aliasing, and the second cache coherency protocol does not support memory attribute aliasing.

The present invention has been illustrated with reference to the IA64 and IA32 operating environments of Intel® Corporation. Persons skilled in the art of processor design, having the benefit of this disclosure, will recognize variations and modifications of the disclosed embodiments, which none the less fall within the spirit and scope of the appended claims.

We claim:

1. A processor, comprising:
   a translation-lookaside-buffer (TLB);
   a cache to provide temporary storage for a data block;
   a memory management unit to implement a first cache-coherency mechanism if the processor is in a first mode and to implement a second cache-coherency mechanism if the processor is in a second mode, wherein the second cache coherency mechanism flushes a selected entry of the cache in response to a memory remapping event.

2. The processor of claim 1, wherein the TLB includes a plurality of entries, each entry including a virtual address tag, a physical address, and a memory attribute.

3. The processor of claim 2, wherein the first cache coherency mechanism snoops the cache if an access to a memory address designated by an uncacheable memory attribute is detected.

4. The processor of claim 1, wherein the memory remapping event maps a logical address to a physical address that is associated with the selected cache entry.

5. A processor, comprising:
   a translation-lookaside-buffer (TLB);
   a cache to provide temporary storage for a data block;
   a memory management unit to implement a first cache-coherency mechanism if the processor is in a first mode and to implement a second cache-coherency mechanism if the processor is in a second mode, wherein the processor is placed in the first mode or the second mode according to a property of an operating system that is booted to run on the processor.

6. The processor of claim 5, wherein the processor is placed in the first mode when the operating system supports memory address aliasing.

7. The processor of claim 5, wherein the processor is placed in the second mode when the operating system does not support memory address aliasing.

8. A computer system, comprising:
   an execution core;
   a cache having a plurality of data entries;
   a memory to store an operating system for the computer system; and
   a memory management unit to manage data flow among the execution core, the cache and the memory, the memory controller to operate in a first cache coherency mode or a second cache coherency mode according to a property of the operating system, wherein the first cache coherency mode supports memory attribute aliasing and the second cache coherency mode does not support memory attribute aliasing, wherein the memory management unit is placed in the first cache coherency mode or the second cache coherency mode when the operating system is booted.

9. The computer system of claim 8, wherein the memory management unit comprises:
   a translation look-aside buffer (TLB) having a plurality of translation entries, each entry having an associated memory attributed; and
   a bus interface to manage memory accesses to the memory.

10. The computer system of claim 9, wherein the memory management unit triggers a cache snoop, responsive to a memory reference that targets an address having an uncacheable memory attribute and flushes the TLB if the memory access is inconsistent with the memory attribute for a corresponding entry in the TLB when the processor is in the first cache coherency mode.

11. The computer system of claim 8, wherein the processor flushes the cache in response to a memory mapping event if the processor is in the second cache coherency mode.

12. The computer system of claim 11, wherein the processor executes a machine check abort if a memory access is inconsistent with a memory attribute associated with data targeted by the memory access.

13. A method for operating a computer system comprising:
   initiating a boot of the computer system;
   identifying an operating system to be run on the computer system; and
   booting the computer system in a first cache coherency mode or a second cache coherency mode responsive to the identified operating system.

14. The method of claim 13, wherein booting the computer system in the first cache coherency mode comprises configuring a memory management unit to self-snoop a cache in response to selected memory accesses.

15. The method of claim 13, wherein booting the computer system in the second cache coherency mode comprises configuring a memory management unit to forward selected memory accesses to a cache to detect memory attribute conflicts.

16. The method of claim 15, further comprising operating the computer system according to the second cache coherency mechanism.

17. The method of claim 16, wherein operating the computer system according to the second cache coherency mechanism comprises:
   searching the cache for a physical address if the physical address is mapped to a logical address; and
   flushing an entry from the cache if the entry is associated with the physical address that is being mapped.

18. The method of claim 15, wherein booting the computer system in the second cache coherency mode comprises booting the processor to disable memory attribute aliasing if the operating system is an IA64 operating system.

19. The method of claim 13, wherein identifying comprises determining whether the operating system is an IA32 operating system or an IA64 operating system.

20. The method of claim 19, wherein booting the computer system in the first cache coherency mode comprises booting the processor to support memory attribute aliasing if the operating system is an IA32 operating system.

* * * * *